(12) United States Patent
Ohya et al.

(10) Patent No.: US 7,468,340 B2
(45) Date of Patent: Dec. 23, 2008

(54) METAL-SUPPORTED POROUS CARBON FILM, FUEL CELL ELECTRODE AND FUEL CELL EMPLOYING THE ELECTRODE

(75) Inventors: Shyusei Ohya, Ichihara (JP); Yuuichi Fujii, Ichihara (JP); Makoto Matsuo, Ichihara (JP); Jun Takagi, Ichihara (JP)

(73) Assignee: Ube Industries, Ltd. (JP)

( * ) Notice: Subject to any disclaimer, the term of this patent is extended or adjusted under 35 U.S.C. 154(b) by 350 days.

(21) Appl. No.: 10/550,902

(22) PCT Filed: Apr. 8, 2004

(86) PCT No.: PCT/JP2004/005092

§ 371 (c)(1),
(2), (4) Date: Sep. 28, 2005

(87) PCT Pub. No.: WO2004/095614

PCT Pub. Date: Nov. 4, 2004

(65) Prior Publication Data
US 2007/0077460 A1    Apr. 5, 2007

(30) Foreign Application Priority Data
Apr. 18, 2003  (JP)  ............... 2003-113978

(51) Int. Cl.
*B01J 21/18*  (2006.01)
*B01J 23/00*  (2006.01)
*B01J 23/40*  (2006.01)
*H01M 4/00*  (2006.01)
*C22C 5/04*  (2006.01)

(52) U.S. Cl. .............. 502/180; 502/182; 502/185; 429/40; 429/41; 429/42; 429/43; 429/44; 977/888; 420/463; 420/465; 420/466

(58) Field of Classification Search ............ 502/180, 502/182, 185; 429/40–44; 977/888; 420/463, 420/465, 466
See application file for complete search history.

(56) References Cited

U.S. PATENT DOCUMENTS 5,071,517 A * 12/1991 Oabayashi ............... 205/158

(Continued)

FOREIGN PATENT DOCUMENTS

EP    1 244 165    * 9/2002

(Continued)

OTHER PUBLICATIONS

"Epitaxially grown model catalyst particles of platinum, rhodium, iridium, palladium and rhenium studied by electron microscopy," G. Rupprechter et al. Thin Solid Films (1995), pp. 148-155.*

(Continued)

*Primary Examiner*—Helene Klemanski
*Assistant Examiner*—Patricia L Hailey
(74) *Attorney, Agent, or Firm*—DLA Piper LLP (US)

(57) ABSTRACT

A metal-supported porous carbon film wherein metal fine particles with a mean particle diameter of 0.7-20 nm are dispersed and supported on pore surface walls, fuel cell electrodes employing the metal-supported porous carbon film, a membrane-electrode assembly comprising the fuel cell electrodes bonded on both sides of a polymer electrolyte film, and a fuel cell comprising the fuel cell electrode as a constituent element. The support structure is such that metal fine particles having a controlled particle size are uniformly supported to allow effective utilization of the metal-based catalyst, and the fabrication steps are simple.

12 Claims, 8 Drawing Sheets

U.S. PATENT DOCUMENTS

| | | | |
|---|---|---|---|
| 5,707,755 A * | 1/1998 | Grot | 429/40 |
| 6,156,449 A * | 12/2000 | Zuber et al. | 429/42 |
| 2002/0132159 A1 * | 9/2002 | Ohya et al. | 429/44 |
| 2002/0146615 A1 | 10/2002 | Yamaura et al. | |
| 2004/0087441 A1 * | 5/2004 | Bock et al. | 502/313 |

FOREIGN PATENT DOCUMENTS

| | | |
|---|---|---|
| EP | 1 244 165 A2 | 9/2002 |
| JP | 62-163261 A | 7/1987 |
| JP | 09-278598 * | 10/1997 |
| JP | 11-012754 * | 1/1999 |
| JP | 2003-317728 A | 11/2003 |
| WO | WO 03/092093 A2 | 11/2003 |

OTHER PUBLICATIONS

"Morphology and control of Pd nanoparticles," Hwaipeng Choo et al. Journal of Molecular Catalysis A: Chemical 244 (2006), pp. 217-228.*

"Electron diffraction and HRTEM studies of multiply-twinned structures and dynamical events in metal nanoparticles: facts and artefacts," P. A. Buffat. Materials Chemistry and Physics 81 (2003), pp. 368-375.*

"Characterization of Pt Microcrystals Using High Resolution Electron Microscopy," N. J. Long et al. Ultramicroscopy 20 (1986), pp. 15-20.*

"Shapes, multiple twins and surface structures of monodisperse FePt magnetic nanocrystals," Zu Rong Dai et al. Surface Science 505 (2002), pp. 325-335.*

E.G. Chen et al., *A Stem Study of a Platinum Deposit on an Amorphous Carbon Film: The Effects of Contact Voltage in the Nucleation Process*, Surface Science, Elsevier Science Publishers B.V. (North-Holland Physics Publishing Division), vol. 144, 1984, Amsterdam, The Netherlands, pp. 465-476.

BingShe Xu et al., *Formation of a New Electric Material: Fullerene/Metal Polycrystalline Film*, Materials Research Society Symposium Proceedings, Materials Research Society, vol. 472, 1997, Pittsburgh, Pa., U.S., pp. 179-184.

* cited by examiner

CROSS-SECTION

SURFACE

ELECTROLESS PLATING TIME: 6min.

ELECTROLESS PLATING TIME: 3min.

METAL-SUPPORTED POROUS CARBON FILM, FUEL CELL ELECTRODE AND FUEL CELL EMPLOYING THE ELECTRODE

TECHNICAL FIELD

The present invention relates to a metal-supported porous carbon film, to a fuel cell electrode and to a fuel cell employing the electrode.

BACKGROUND ART

Great advances have been achieved in the development and the implementation of fuel cells, in recent years. In the case of a solid polymer electrolyte fuel cell, for example, the fuel cell is constructed by bonding gas diffusion electrodes obtained by providing a porous carbon film composed of a carbon fiber sheet with a thickness of 0.1-0.3 mm, on the surface of which a platinum-based catalyst is supported as an electrode catalyst on both sides of a polymer solid electrolyte layer, and providing a separator, made of a dense carbon board with a thickness of 1-3 mm and having a gas flow channel on the outside of the porous carbon film, on each side.

In the case of a phosphoric acid-type fuel cell, for example, the fuel cell is constructed by bonding gas diffusion electrodes, obtained by providing a porous carbon film, composed of a carbon fiber sheet with a thickness of 0.1-0.3 mm and on the surface of which a platinum-based catalyst is supported as an electrode catalyst, on each side of an electrolyte layer obtained by supporting phosphoric acid on a phosphoric acid support, and providing a separator, made of a dense carbon board with a thickness of 1-3 mm and having a gas flow channel on the outside of the porous carbon film, on each side.

Powdered materials such as carbon black have conventionally been used as carbon materials for precious metal-based catalyst supports because they increase the supporting specific surface area. For application to fuel cell electrodes, however, resin binders with substantially no electron conductivity must be used for molding into film shapes (for example, Japanese Unexamined Patent Publication No. 5-36418), and this has led to such problems as increased internal resistance of the electrodes, poor in-plane uniformity of the reaction and, consequently, inferior battery properties.

The present inventors have previously proposed a porous carbon film which can retain a film-like shape without using a resin binder, and its application to fuel cell electrodes.

However, the important step of stirring in conventional metal dispersing supporting techniques employing metal precursor solutions is difficult to apply to porous carbon films, while it has been extremely difficult to support nanosize-scale metal fine particles in a uniform manner.

Moreover, metals commonly used for fuel cell electrodes, and especially platinum-based materials, are very expensive and, although it is desirable to achieve dispersion and support of fine particles (preferably 2-10 nm fine particles) in a uniform manner in order to maximize their activity per weight, no method has yet been achieved for achieving uniform dispersion while also accomplishing particle size control, and therefore it is currently the case that the supporting of metals, such as platinum, must be accomplished on the basis of experience and intuition.

DISCLOSURE OF INVENTION

It is an object of the present invention to provide a metal-supported porous carbon film, a fuel cell electrode and a fuel cell employing the electrode, wherein the support structure is such that metal fine particles having a controlled particle size are uniformly supported to allow effective utilization of the metal-based catalyst, and the fabrication steps are simple.

The invention provides a metal-supported porous carbon film wherein metal fine particles with a mean particle diameter of 0.7-20 nm are dispersed and supported on pore surface walls.

The invention further provides a fuel cell electrode employing the aforementioned metal-supported porous carbon film.

The invention still further provides a membrane-electrode assembly comprising such fuel cell electrodes bonded on both sides of a polymer electrolyte film.

The invention still further provides a fuel cell comprising the aforementioned fuel cell electrode as a constituent element.

BEST MODE FOR CARRYING OUT THE INVENTION

Figure 1:
FIG. 1 is an SEM photograph of the platinum-supported porous carbon film obtained in Example 1, as an embodiment of the invention.
Figure 1:
Figure 2:
FIG. 2 is an SEM photograph of the platinum-supported porous carbon film obtained in Example 2, as an embodiment of the invention.
Figure 2:
Figure 3:
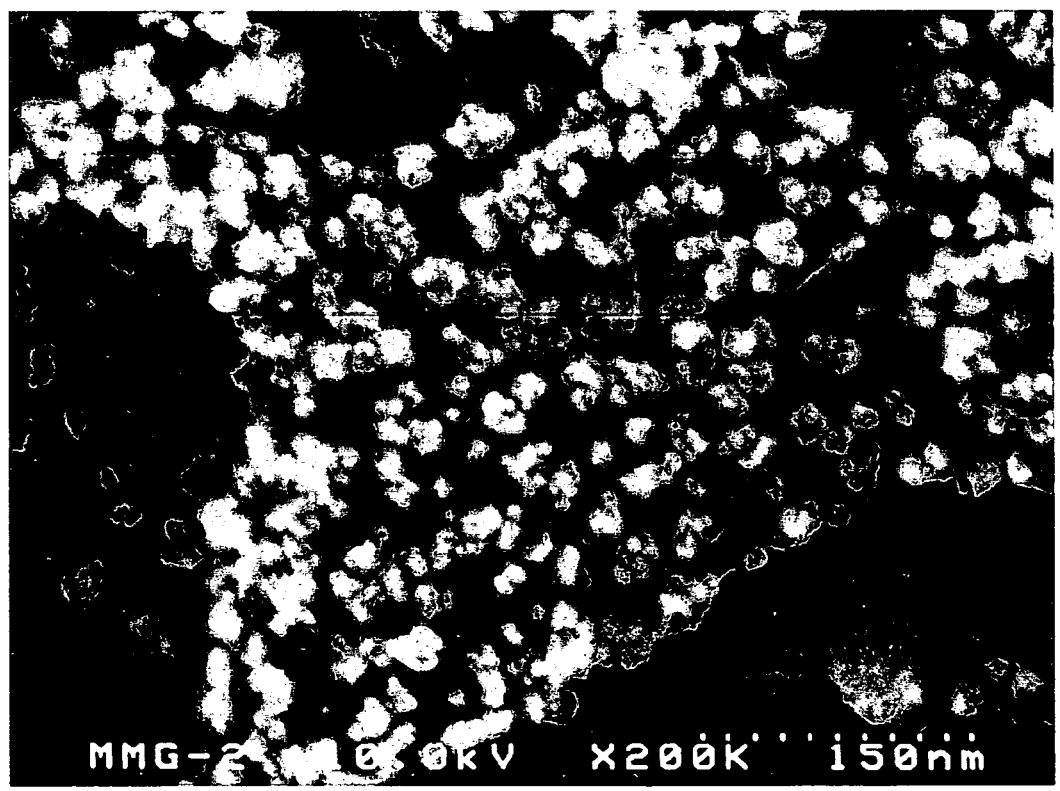
FIG. 3 is an SEM photograph of the platinum-supported porous graphite film obtained in Example 3, as an embodiment of the invention.
Figure 4:
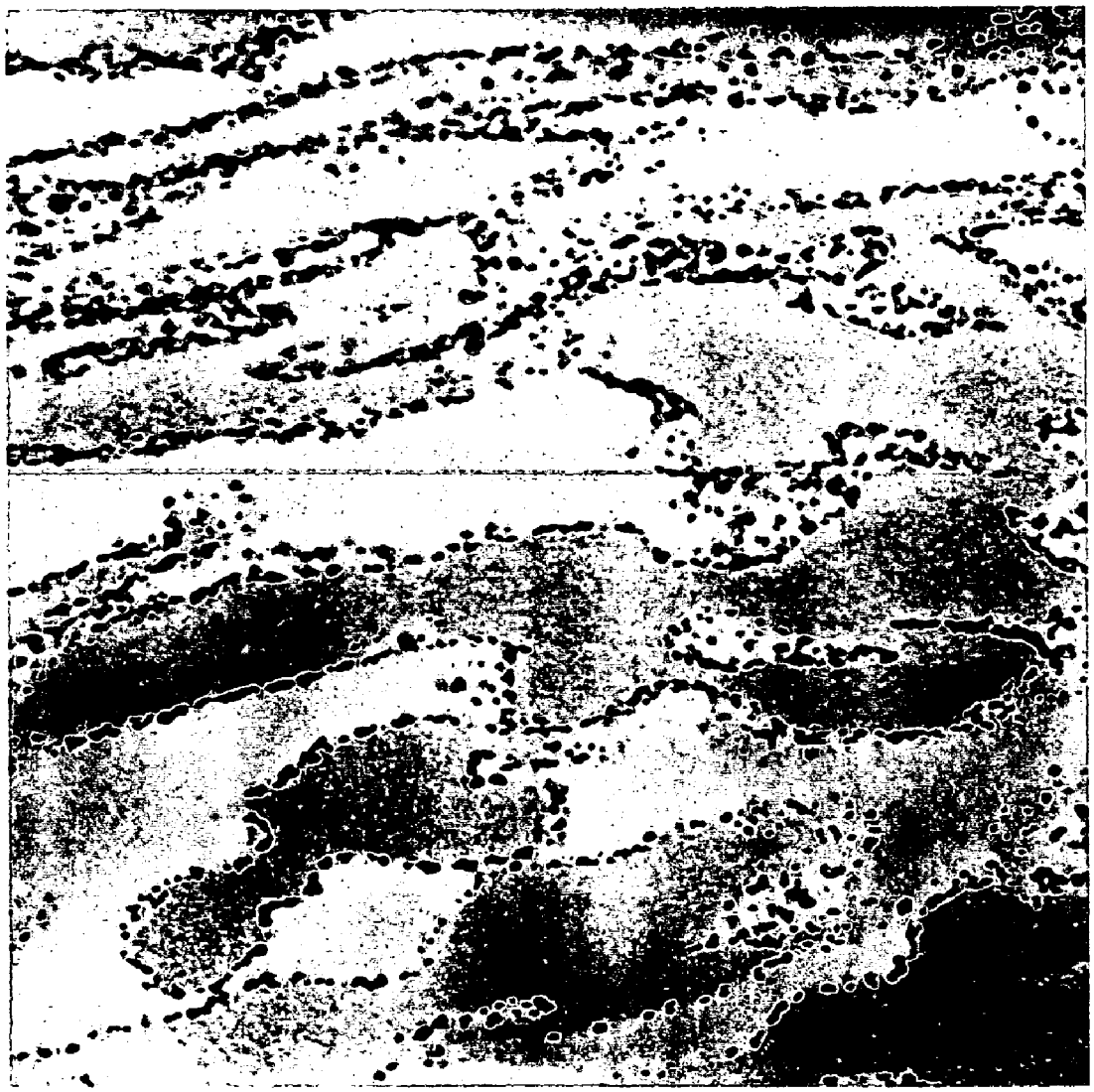
FIG. 4 is a TEM photograph of the platinum-supported porous graphite film obtained in Example 3, as an embodiment of the invention.
Figure 5:
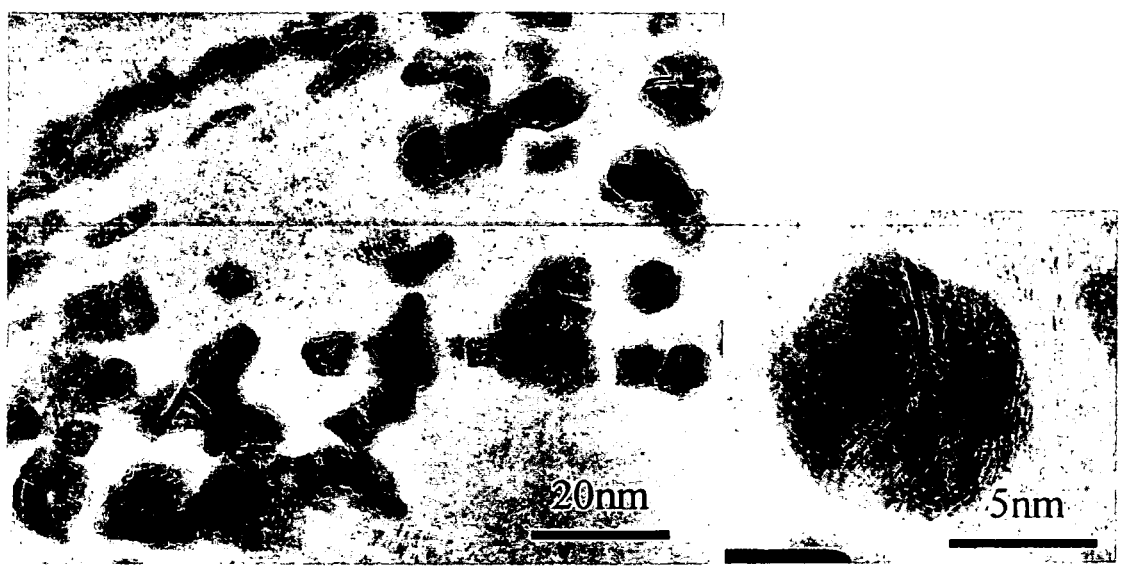
FIG. 5 is a magnified view of FIG. 4. The photograph at the right shows the obtained multiply-twinned particles.
Figure 6:
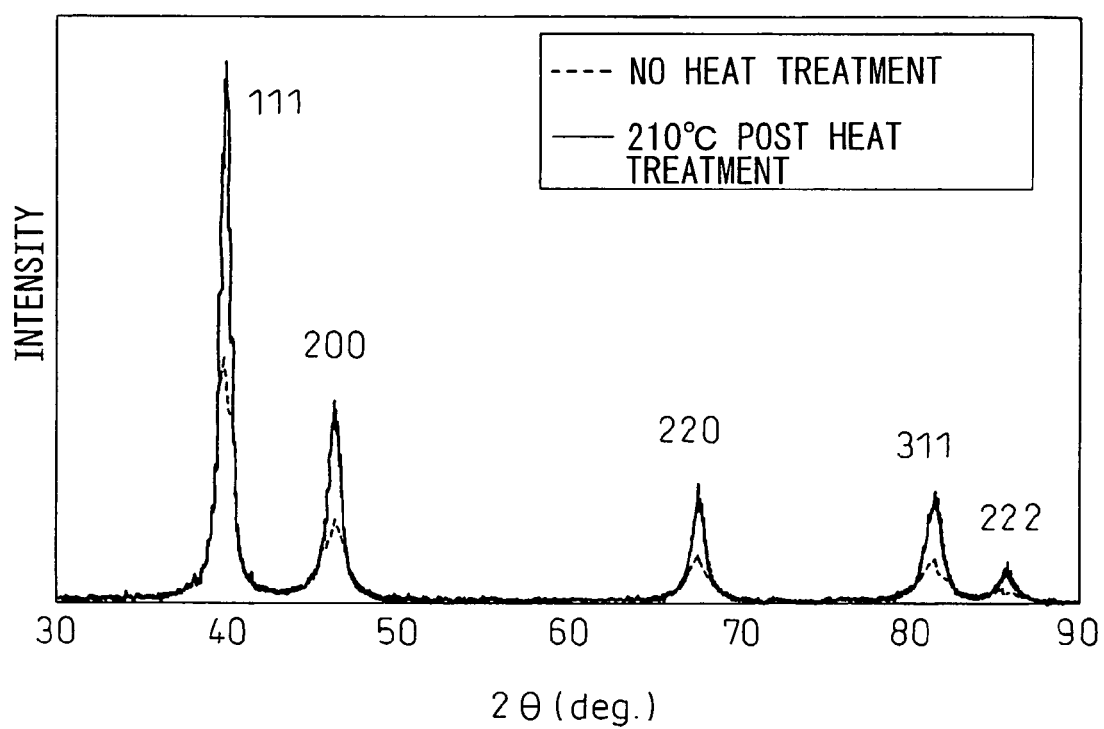
FIG. 6 is an X-ray scattering profile after post-heat treatment of the platinum-supported porous graphite film obtained in Example 3, as an embodiment of the invention.
Figure 7:
FIG. 7 is a photograph of the outer appearance of the MEA obtained in Example 5, as an embodiment of the invention.

Preferred embodiments of the present invention will now be described.

1) The aforementioned metal-supported porous carbon film, wherein the metal fine particles contain platinum element.

2) The aforementioned metal-supported porous carbon film, wherein the metal fine particles undergo chemical reduction of the metal compound with a reducing agent via a catalyst on the pore surfaces of the porous carbon film for fine dispersion of the metal fine particles.

3) The aforementioned metal-supported porous carbon film, wherein the catalyst is a palladium compound supported on a carbon film.

4) The aforementioned metal-supported porous carbon film, wherein from 15% to 95% of the metal fine particles consist of multiply twinned particles.

5) The aforementioned metal-supported porous carbon film, wherein the multiply twinned particles are composed mainly of platinum.

The metal-supported porous carbon film of the invention may preferably be obtained by finely dispersing metal fine particles in a uniform manner, with metal fine particles having a mean particle diameter of 0.7-20 nm, especially 1-10 nm dispersed and supported on the pore surface walls, by selective chemical reduction reaction with a reducing agent via a chemical reduction catalyst for the metal compound on the pore surfaces of the porous carbon film, preferably by chemical plating (electroless plating).

According to the production process described above, it is possible to easily support metal fine particles by employing only a very gentle stirring procedure.

Since the aforementioned production process produces precipitation simultaneously with selective reduction of the metal ions on the pore surfaces of the porous carbon film, the growth of the metal fine particles is in the form of epitaxial growth, and the resulting metal fine particles have very high crystallinity while the particles are also physicochemically stable, thereby allowing the fine metal particles to be finely dispersed and supported on the pore walls in a uniform manner.

According to the production process described above, the precipitation of the metal fine particles occurs simultaneously across the whole surface without a location-dependent time lag, and the particle sizes of the metal fine particles in the support are monodispersively arranged, with the particle sizes freely controlled on the nanoscale.

In particular, multiply twinned particles produced in the above-mentioned process of epitaxial growth have particle surfaces composed of highly surface active high-density crystal faces and, because of their shape stability which allows them to maintain their initial structure for long periods, an overall enhancement is achieved in the properties of the fuel cell.

The metal may be one selected from the group consisting of palladium, platinum, rhodium, ruthenium and iridium, or an alloy of these substances, their combinations or combinations thereof with other transition metals, and preferably it is a precious metal which is platinum or an alloy thereof.

According to the invention, the metal-based catalyst support used is a porous carbon film or porous graphite film, and preferably a porous graphite film.

The porous carbon film has a porous structure with fine connected pores, and preferably it has a mean pore size of 0.05-10 µm and a void percentage of 25-85%, and especially a thickness of 3-100 µm.

The porous carbon film comprises a carbon film structure having a porous structure with fine connected pores, wherein the surface is smooth other than at the open pores. A porous film having such fine connected pores is a film having "open pores" wherein pores on any surface pass through to the other surface in the form of a channel, wherein a wall-like structure is formed between adjacent pores and the pores have curved, nonrectilinear structures while the sections other than the open pores are smooth. That is, this film has a three-dimensional network structure composed of carbon in the absence of a binder.

The porous carbon film preferably has a mean pore size of 0.05-10 µm and especially 0.05-2 µm, a void percentage of 25-85% and especially 30-70%, and a thickness of 3-100 µm and especially 5-40 µm, and is most preferably a porous graphite film.

The carbon film structure of the porous carbon film preferably has a graphitization of 10% or greater, preferably 30% or greater and most preferably 90% or greater. The graphitization is preferably greater than 30% or greater to produce a higher conductivity than an electrode comprising ordinary carbon powder, and it is preferably 90% or greater to increase the mechanical strength of the electrode and enhance its plasticity.

The porous carbon film is preferably produced by heat carbonization of a highly heat resistant polymer film having a porous structure with fine connected pores and having a generally smooth surface other than at the open pores, and preferably a polyimide porous film, in an anaerobic atmosphere, and preferably in an inert gas such as nitrogen gas, argon gas or helium gas, or in a vacuum. In order to increase the graphitization of the carbon structure for higher mechanical strength, electrical conductivity or thermal conductivity, the temperature range is preferably 1200-3500° C., more preferably 1900-3000° C. and even more preferably 2600-3000° C., with holding from 20-180 minutes in this range.

The metal compound used to produce the metal fine particles by electroless plating may be an inorganic salt or carbonic acid salt of palladium, platinum, rhodium, ruthenium or iridium, and it is preferably a chloride.

It is preferred to add the necessary amounts of a tartaric acid salt, ethylenediaminetetraacetic acid, Rossel salt, etc. as a chelating agent and a hydrazine salt or the like which acts as a reducing agent to the electroless plating solution, but there are no particular restrictions on the solution composition so long as it is adjusted for reductive precipitation of the desired metal substantially by the reducing effect of the catalyst alone.

In the process described above, the surface of the porous carbon film is preferably washed beforehand. Cleaning with an organic solvent such as acetone or methanol is preferred for removal of oily components, while cleaning with an acid is preferred for removal of inorganic components. This cleaning is preferably followed by thorough water washing. The metal element which is to serve as the catalyst at the initial stage of the electroless plating step is attached to the pore surfaces of the porous carbon film. The element to be attached is not particularly restricted so long as it has reducing action for the electroless plating treatment, but palladium is preferably used. In the case of palladium, the porous carbon film may be immersed in an acidic aqueous solution of tin chloride ($SnCl_2$) to attach $Sn^{2+}$ to the pore surfaces, is subsequently cleaned, and then is immersed in an acidic aqueous solution of a palladium compound, for example, palladium chloride, palladium oxide or the like, for electron transfer from $Sn^{2+}$ to $Pd^{2+}$ to attach reduced Pd to the pore surfaces. Alternatively, a palladium compound such as a metal salt of palladium or an organic palladium complex may be dissolved in an appropriate solvent to prepare a solution to be used for adsorption of Pd ions onto the carbon surface, which are then reduced.

In the process described above, the electroless plating is preferably carried out with adjustment to alkalinity by addition of ammonia water, an alkali hydroxide solution, purified water or the like to a solution of the metal compound, such as the platinum compound, at the desired concentration. The alkali hydroxide solution used may be an ammonia water solution, and the degree of alkalinity is preferably in the range of pH 8-12.5. Upon adjustment to alkalinity, the catalytic effect of the palladium causes reduction of the metal (platinum) and its precipitation on the pore surfaces.

The porous carbon film which has been pretreated by the aforementioned cleaning, etc. is preferably immersed in the aforementioned electroless plating solution, and subjected to electroless plating at 50-70° C. for about 1-20 minutes, especially 1-10 minutes. If the electroless plating time is too long, the metal fine particle sizes become too large, resulting in formation of a metal layer.

This process can accomplish uniform support of metal fine particles, and particularly platinum fine particles, on the pore surfaces of a porous carbon film.

According to the invention, the metal, and preferably platinum, must be deposited in the form of fine particles, and for this purpose the temperature and time ranges specified above are preferred.

Next, the porous carbon film is removed from the solution and washed with water for repeated cleaning until the washing solution becomes neutral, and then dried to obtain the desired metal-supporting porous carbon film as a catalyst for a fuel cell. Also, post-heat treatment is preferably carried out under conditions in which an oxide or carbide thin film is not formed on the surface of the supported metal fine particles, and preferably under conditions in a vacuum, or in an inert gas atmosphere, at 150-400° C. and preferably 180-350° C. for 10-180 minutes and preferably 20-120 minutes, in order to remove adhering matter on the metal fine particle surfaces and improve the crystallinity. This range is preferred because a lower temperature will reduce the effect, while a higher temperature will promote reaction of the metal fine particles with the carbon of the base material, leading to surface contamination or embedding of the metal fine particles in the base material.

When the metal-supported porous carbon film according to the invention is used for a solid polymer-type fuel cell, the amount of precious metal particles supported will differ depending on the properties required for the fuel cell to be fabricated using the electrode, and on the electrode film thickness and specific surface area; however, in terms of unit area of the electrode, at the cathode, it is preferably used in an amount of between 0.01 mg/cm$^2$ and 1.0 mg/cm$^2$, and especially no greater than 0.5 mg/cm$^2$, with no greater than 0.25 mg/cm$^2$ being particularly preferred, while at the anode it is preferably used in an amount of between 0.005 mg/cm$^2$ and 0.5 mg/cm$^2$.

In order to obtain a fuel cell electrode of the invention, the composition comprising the aforementioned metal-supported porous carbon film, and optionally a polymer electrolyte or oligomer electrolyte (ionomer), homogeneously dispersed in a solvent is coated and dried onto the entirety, or in a prescribed pattern, on one surface of the metal-supported porous carbon film.

The amount of polymer electrolyte or oligomer electrolyte used will differ depending on the electrode film thickness and the pore specific surface area and, for example, with an electrode thickness of 30 μm, it is preferably between 0.1 mg/cm$^2$ and 5 mg/cm$^2$, especially no greater than 2 mg/cm$^2$ and most preferably no greater than 1 mg/cm$^2$, per unit area of the electrode.

The polymer electrolyte or oligomer electrolyte used may be any polymer or oligomer with ion conductivity, or any polymer or oligomer which produces a polymer or oligomer with ion conductivity by reaction with an acid or base.

As polymer electrolytes or oligomer electrolytes there may be mentioned fluoropolymers having pendant ion exchange groups such as sulfonic acid groups in protonic or salt form, for example, sulfonic acid fluoropolymers such as Nafion (registered trademark of DuPont), sulfonic acid fluorooligomers, sulfonated polyimides, sulfonated oligomers and the like.

The polymer electrolyte or oligomer electrolyte must be essentially insoluble in water at temperatures of up to 100° C.

As solvents there may be mentioned polar solvents such as C1-6 alcohols, glycerin, ethylene carbonate, propylene carbonate, butyl carbonate, ethylene carbamate, propylene carbamate, butylene carbamate, acetone, acetonitrile, dimethylformamide, dimethylacetamide, 1-methyl-2-pyrrolidone, difluorobenzene and sulfolane. An organic solvent may be used alone or in admixture with water. When a mixture of an organic solvent and water is used, the proportion is preferably a volume ratio in the range of organic solvent:water=10:1-1:3.

A membrane-electrode assembly of the invention may be obtained by bonding a fuel cell electrode obtained in the manner described above on both sides of a polymer electrolyte film by hot pressing, for example.

The polymer electrolyte film may be any polymer or oligomer with ion conductivity, or any polymer or oligomer which produces a polymer or oligomer with ion conductivity by reaction with an acid or base, as mentioned above.

A fuel cell of the invention may be obtained by using the aforementioned membrane-electrode assembly as a constituent element, and preferably using the membrane-electrode assembly at the high water-generating oxygen end, and using the membrane-electrode assembly or another membrane-electrode assembly (also referred to as membrane-electrode structure) at the hydrogen end (fuel end), by situating a pair of separators on both sides of the electrode, either directly or via a gas diffusion layer, and situating a seal between the pair of separators to prevent leakage of reaction gas.

The present invention will now be further explained through the following examples, with the understanding that the invention is in no way limited by these examples.

In the examples, the gas permeability, void percentage, mean pore size, graphitization and fuel cell performance were evaluated by the following methods.

[1] Gas Permeability

This was measured according to JIS P8117. A B-type Gurley densometer (product of Toyo Seiki K.K.) was used as the measuring apparatus. The sample film was clamped onto a circular hole with a 28.6 mm diameter, 645 mm$^2$ area, and an internal cylinder with a weight of 567 g was used to pass the air in the cylinder from the test circular hole section out of the cylinder. The time for permeation of 100 cc of air was measured and recorded as the gas permeability (Gurley number).

[2] Void Percentage

The film thickness, area and weight of a film cut to a prescribed size were measured, and the void percentage was calculated from the basis weight by the following formula. In the formula, S is the film area, d is the film thickness, w is the measured weight and D is the density. With a value of 1.34 of polyimide, the density of each carbon film structure sample was calculated in consideration of the graphitization as determined by the method described below.

$$\text{Void percentage} = (1 - (W/S \times d \times D)) \times 100$$

[3] Mean Pore Size of Film Surface

A scanning electron microscope photograph was taken of the film surface, the pore area of 50 or more open sections was measured, and the mean diameter was calculated from the mean value of the pore area according to the following formula, assuming circular pore shapes. Sa in the formula represents the mean value of the pore area.

$$\text{Mean pore size} = 2 \times (Sa/\pi)^{1/2}$$

[4] Graphitization

The X-ray diffraction was measured and the graphitization was determined by the Ruland method.

[5] Porous Carbon Film Thickness

The thickness of the porous carbon film was determined using a contact film thickness meter and by observation of a cross-section with a scanning microscope.

[6] Precious Metal Particle Size

The size of the precious metal fine particles dispersed on the electrodes were evaluated by TEM and SEM observation.

[7] Fuel Cell Performance Evaluation

A fuel cell electron charge apparatus was used for power generation with a cell interior fuel gas pressure of 0.1 MPa and a cell temperature of 80° C., and humidification of the fuel gas using a bubbler at 70° C., and the current-voltage characteristic was measured.

REFERENCE EXAMPLE 1

Production of Porous Polyimide Film

After polymerizing 3,3',4,4'-biphenyltetracarboxylic dianhydride and paraphenylenediamine in N-methyl-2-pyrrolidone, the obtained polyamic acid solution was cast to a prescribed thickness onto a mirror-polished stainless steel sheet, and then a doctor knife was used to uniformly coat NMP thereover, after which it was allowed to stand for 1 minute and was subsequently immersed in methanol for precipitation of a polyamic acid film. It was then immersed in an ion-exchanged water bath to release the film from the stainless steel sheet and dried, and finally heat treated at 400° C. for 20 minutes to obtain a porous polyimide film.

The film had an imidation of 90%, a film thickness of 32 μm, a gas permeability of 20 sec/100 ml, a void percentage of 45% and a film surface mean pore size of 0.15 μm. This film was confirmed to have a three-dimensional network structure composed of polyimide through SEM observation.

REFERENCE EXAMPLE 2

Production of Porous Carbon Film

The porous polyimide film was carbonized at a temperature of 2100° C. for 120 minutes under a nitrogen gas stream to obtain a porous carbon film with a graphitization of 40%, a film thickness of 27 μm, a gas permeability of 26 sec/100 ml, a void percentage of 40% and a mean pore size of 0.13 μm. This film was confirmed to have a three-dimensional network structure composed of carbon through SEM observation.

REFERENCE EXAMPLE 3

Production of Porous Graphite Film

The porous carbon film was held at 3000° C. for 120 minutes in an argon gas atmosphere to obtain a porous graphite film having a crystallization (graphitization) of 90% or greater, a mean pore size of 0.11 μm, 24 μm of membrane thickness, a lattice constant of 2.53 Å on the a axis and 6.68 Å on the c axis and a crystallite size of 180 Å on the (002) face and 90 Å on the (101) face. Penetration of methanol, dropped onto the film surface, through to the back confirmed the presence of fine connected pores in the film interior.

EXAMPLE 1

The porous carbon film obtained in Reference Example 2 was immersed in acetone and methanol for cleaning and then water washed, immersed for 5 minutes in an aqueous $SnCl_2$-hydrochloric acid solution, immersed for 1 minute in a water bath, and then immersed for 5 minutes in an aqueous $PdCl_2$-hydrochloric acid solution and washed with purified water.

TPX-205MU (solution comprising platinum compound and additives) and TPX-205R (solution comprising reducing agent and additives) by Tanaka Kikinzoku K.K. were used as solvents for a platinum electroless plating solution, and then ammonia water and purified water were mixed and stirred therewith at appropriate points to prepare an electroless plating treatment solution with a pH of about 10 at room temperature, after which it was heated to a solution temperature of 60° C.

The aforementioned porous carbon film, held at the perimeter by a fluorine resin frame, was immersed in the electroless plating bath and rotated for an appropriate time at a slow speed with the frame to deposit the platinum fine particles on the pore surfaces of the porous carbon film. After 8 minutes, the film was pulled out from the plating bath and washed with purified water and dried to obtain a porous carbon film having platinum fine particles dispersed therein.

The surface and cross-section of the porous carbon film having the platinum fine particles dispersed therein were observed with a scanning electron microscope (SEM).

As a result, it was confirmed that platinum fine particles of approximately 10 nm were dispersed and supported in a uniform manner without aggregation. Also, observation of the platinum fine particles with a high-resolution transmission electron microscope (hereinafter abbreviated as HRTEM) revealed a proportion of multiply twinned particles of approximately 20%, in terms of the number of particles formed.

EXAMPLE 2

The porous carbon film obtained in Reference Example 2 was immersed in acetone and methanol for cleaning. It was then washed with water, immersed for 1 hour in a solution prepared by dissolving organic palladium (Pd-C8, product of Degussa Japan K.K.) in methanol, and then removed and heat treated in air at 300° C. for 1.5 hours to disperse the Pd element in the carbon film.

Next, the same procedure was carried out as in Example 1, except that the plating time was 3 minutes and 5 minutes, to obtain a porous carbon film having platinum fine particles dispersed therein having platinum fine particles dispersed therein. A portion thereof was heat treated in a vacuum at 210° C. for 60 minutes.

The porous carbon film having platinum fine particles dispersed and supported therein was subjected to SEM and HRTEM observation to determine the mean particle diameter and proportion of multiply twinned particles. Both of the carbon films were confirmed to have platinum fine particles dispersed and supported on the film surface and on the pore surfaces inside the film.

The mean particle diameter and proportion of multiply twinned particles of the platinum fine particles of the platinum-supported porous carbon films of Example 2, as well as the results of elemental analysis by ICP emission analysis, are summarized in Table 1. The mean platinum particle diameter determined by the SEM and HRTEM observation after the past heat treatment was not different from that before the heat treatment.

TABLE 1

| Electroless plating treatment time (min) | Platinum (wt %) | Palladium (wt %) | Mean particle diameter (nm) | Proportion of multiply twinned particles (%) |
|---|---|---|---|---|
| 0 | ≦0.1 | 0.4 | — | — |
| 3 | 13 | 0.5 | 3.8 | 18 |
| 6 | 24 | 0.4 | 6.0 | 23 |

EXAMPLE 3

A platinum-supported porous graphite film was obtained in the same manner as Example 2, except that the porous graphite film obtained in Reference Example 3 was used.

The mean particle diameter and multiply twinned particles were determined by SEM and HRTEM observation. All of the carbon films were confirmed to have platinum fine particles dispersed and supported on the film surface and on the pore surfaces inside the film.

The mean particle diameter and proportion of multiply twinned particles of the platinum fine particles of the platinum-supported porous graphite film of Example 3, as well as the results of elemental analysis by ICP emission analysis are summarized in Table-2.

TABLE 2

| Electroless plating treatment time (min) | Platinum (wt %) | Palladium (wt %) | Mean particle diameter (nm) | Proportion of multiply twinned particles (%) |
|---|---|---|---|---|
| 0 | ≦0.1 | 0.3 | — | — |
| 3 | 7 | 0.3 | 3.4 | 16 |
| 6 | 18 | 0.3 | 5.7 | 20 |

EXAMPLE 4

The platinum-supported porous carbon film and platinum-supported graphite film obtained in Examples 2 and 3 were examined by X-ray scattering to confirm the platinum crystal structures. It was confirmed that the post-heat treated samples had sharper scattering at the wide-angle end and thus higher crystallinity.

EXAMPLE 5

The platinum-supported porous carbon film obtained in Example 2 with an electroless plating time of 6 minutes and post-heat treated was used for dropping of 0.3 mg of Nafion/DMF/aqueous solution per $cm^2$ of the electrode projected area, and then was heat treated to obtain an electrode coated with a proton-conducting film. The sum of the platinum and palladium par the projected area of this electrode was 0.48 $mg/cm^2$.

The electrode was positioned on both sides of a commercially available Nafion 11 film (DuPont) and heat-pressed to obtain a membrane-electrode assembly (MEA) for a solid polymer-type fuel cell.

The MEA was sandwiched on both sides with carbon paper by Toray Co. and incorporated into a fuel cell by Electro-Chem, and a fuel cell power generation test with a cell temperature of 80° C., using hydrogen and oxygen gas as fuel.

Figure 8:
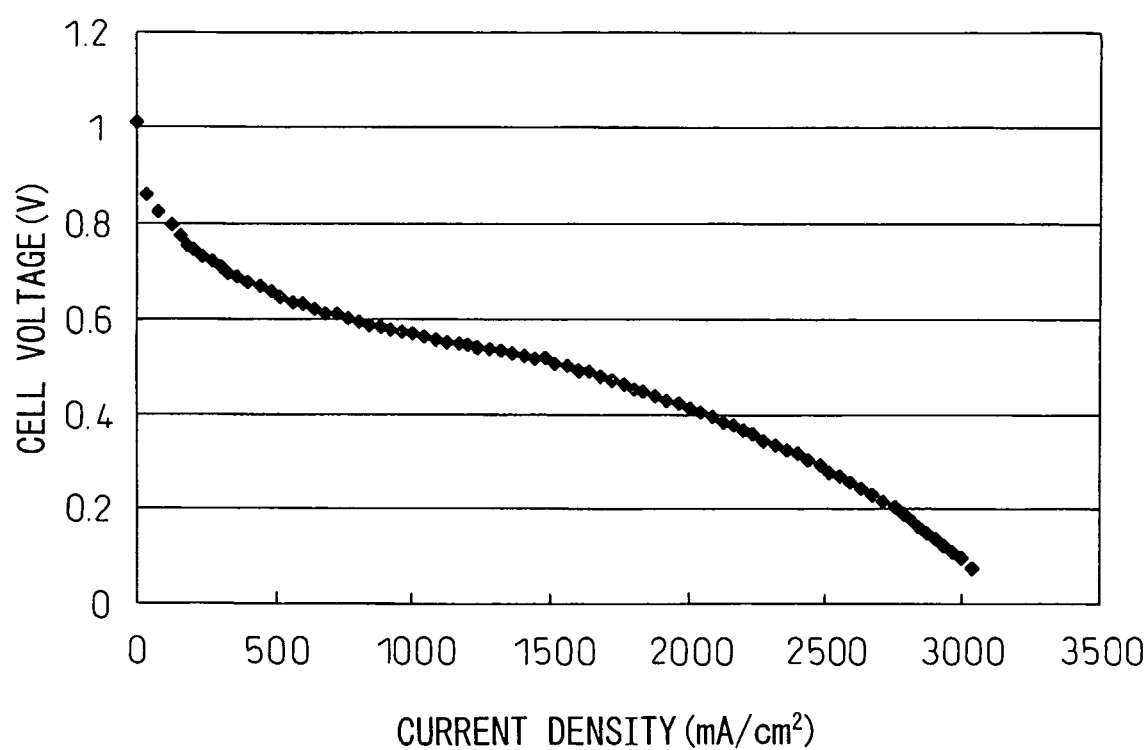
FIG. 8 is a power generation characteristic curve (I-V curve) measured using the fuel cell obtained in Example 5, as an embodiment of the invention.

As a result, satisfactory power generation characteristics were confirmed. The results are shown in FIG. 8. No breakage of the MEA was seen even when the MEA was removed from the cell after the power generation test. After several days, the MEA was incorporated into a new fuel cell and subjected to the same power generation test, and reproducible satisfactory power generation characteristics were exhibited.

When the test was conducted using an electrode which had not been post-heat treated, separate from Example 5, the output characteristic was approximately 8% lower than the 210° C. post-heat treated electrode.

INDUSTRIAL APPLICABILITY

According to the invention, it is possible to obtain a metal-supported porous carbon film wherein the support structure is such that metal fine particles having a controlled particle size are uniformly supported to allow effective utilization of the metal-based catalyst, and the fabrication steps are simple.

Also to according to the invention, it is possible to obtain a fuel cell electrode and membrane-electrode assembly wherein the support structure allows effective utilization of the precious metal-based catalysts, and the fabrication steps are simple.

Also according to the invention, it is possible to obtain a stably operating fuel cell.

The invention claimed is:

1. A metal-supported porous carbon film wherein metal fine particles with a mean particle diameter of 0.7-20 nm are dispersed and supported on pore surface walls and wherein from 15% to 95% of the metal fine particles consist of multiply twinned particles.

2. The metal-supported porous carbon film according to claim 1, wherein the metal fine particles contain platinum.

3. The metal-supported porous carbon film according to claim 2, wherein the metal fine particles undergo chemical reduction of the metal compound with a reducing agent via a catalyst on the pore surfaces of the porous carbon film for fine dispersion of the metal fine particles.

4. The metal-supported porous carbon film according to claim 3, wherein the catalyst is a palladium compound supported on a carbon film.

5. A fuel cell electrode comprising a metal-supported porous carbon film according to claim 2.

6. The metal-supported porous carbon film according to claim 1, wherein the metal fine particles undergo chemical reduction of the metal compound with a reducing agent via a catalyst on the pore surfaces of the porous carbon film for fine dispersion of the metal fine particles.

7. The metal-supported porous carbon film according to claim 6, wherein the catalyst is a palladium compound supported on a carbon film.

8. The metal-supported porous carbon film according to claim 1 wherein the multiply twinned particles are composed mainly of platinum.

9. A fuel cell electrode comprising a metal-supported porous carbon film according to claim 8.

10. A fuel cell electrode comprising a metal-supported porous carbon film according to claim 1.

11. A membrane-electrode assembly comprising fuel cell electrodes according to claim 10 bonded on both sides of a polymer electrolyte film.

12. A fuel cell comprising a fuel cell electrode, according to claim 10, as a constituent element.

\* \* \* \* \*